April 18, 1961    J. C. DANLY    2,979,972
READILY ADJUSTABLE ELECTRIC INDEXING APPARATUS
Filed May 31, 1957
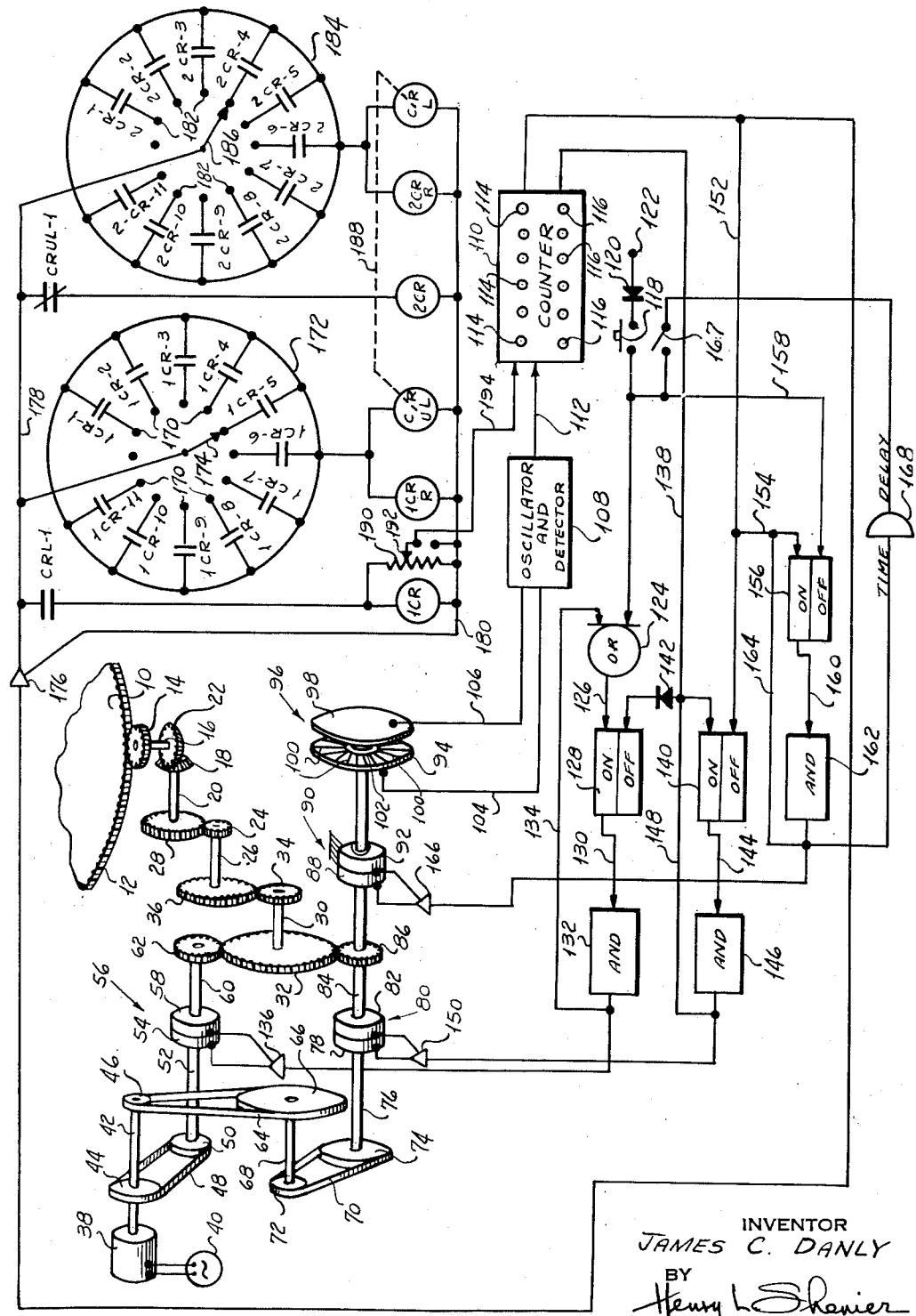
INVENTOR
JAMES C. DANLY
BY
Henry L. Shenier
ATTORNEY

United States Patent Office 2,979,972
Patented Apr. 18, 1961

2,979,972

READILY ADJUSTABLE ELECTRIC INDEXING APPARATUS

James C. Danly, River Forest, Ill., assignor to Danly Machine Specialties, Inc., Chicago, Ill., a corporation of Illinois Filed May 31, 1957, Ser. No. 662,725

9 Claims. (Cl. 74—821)

My invention relates to a readily adjustable electric indexing apparatus and, more particularly, to a readily adjustable electric indexing apparatus which is flexible and which is simple in construction and in operation.

Indexing means known in the prior art may be operated to divide a revolution of a work member into a predetermined number of indexing steps. In mechanical systems of the prior art, to accomplish this result a dividing head is used with a number of interchangeable indexing plates. Each of the plates has a number of circles of holes adapted to receive a locating pin carried by a crank geared to the crank member to be indexed. The crank is moved from hole to hole in the index plate to drive the work member through a single revolution in a series of steps equal to the number of holes in the particular circle being used. The spacing of the holes of each circle on the respective plates is varied to provide indexing steps of different lengths. This system of the prior art is cumbersome and inconvenient to use. When the indexing interval is changed frequently, the crankpin must be changed from circle to circle, and, in many instances the indexing plate must be changed. In addition, if the system is to be given any appreciable degree of flexibility, a large number of indexing plates must be employed. It will be seen that the indexing systems of the prior art are neither very flexible nor are they readily adjustable.

I have invented an indexing apparatus which overcomes the disadvantages of systems of the prior art. My apparatus is flexible in that it can divide a revolution into a large number of different parts. My apparatus is readily adjustable in that it permits the number of indexing steps, and thus the length of one step, to be changed with ease. The accuracy of my apparatus is repetitive to produce substantially identical respective steps for each revolution of a worktable or the like. My system is simple in construction and operation as compared with systems of the prior art.

One object of my invention is to provide a readily adjustable electric indexing apparatus which is capable of dividing a revolution of a work member into many different numbers of parts.

Another object of my invention is to provide a readily adjustable electric indexing device which permits the number of indexing steps to be changed with ease.

A further object of my invention is to provide a readily adjustable electric indexing device, the accuracy of which is repetitive.

A still further object of my invention is to provide a readily adjustable electric indexing device which is simpler in construction and in operation than are indexing systems of the prior art.

Other and further objects of my invention will appear from the following description:

In general my invention contemplates the provision of a readily adjustable electric indexing system for a worktable or the like having a high-speed drive and a low-speed drive. A transducer responsive to both of the drives produces a predetermined number of electrical impulses per revolution of the table. I set a counter, to which the transducer pulses are fed, to a first predetermined count equal to the number of impulses produced by the transducer during the selected indexing step of the table, and to a second predetermined count less than said first predetermined count by a selected amount. At the beginning of an indexing step, the high-speed drive is energized to drive the transducer and table. When the number of pulses reaches the second predetermined count, the counter produces a first output signal. Means responsive to this signal de-energizes the high-speed drive and energizes the low-speed drive. When the number of transducer impulses reaches the first predetermined count, the counter produces a second output signal and resets. Means responsive to the second signal de-energizes the slow drive and actuates a brake to stop the table. My apparatus has means for automatically recycling after a predetermined time delay. I provide my apparatus with means for permitting the apparatus to function with a small, uniformly distributed error when the number of transducer pulses per indexing step is a fractional number.

In the accompanying drawing which forms part of the instant specification and which is to be read in conjunction therewith the figure is a schematic view of one form of my readily adjustable electric indexing apparatus.

Referring more particularly to the drawing, my readily adjustable electric indexing apparatus may be used to drive a worktable or carrier 10 through a single revolution in a predetermined number of steps. In this use of my apparatus, teeth 12 formed on the periphery of the table 10 are engaged by a pinion 14 carried by a shaft 16 for rotation with the shaft. A bevel gear 18 carried by a shaft 20 for rotation with the shaft drives a bevel gear 22 fixed on shaft 16 for rotation with it. A pinion 24 fixed on a shaft 26 drives a gear 28 carried by shaft 20 for rotation with it. A shaft 30 driven by a gear 32 fixed on the shaft drives a pinion 34 which in turn drives a gear 36 carried by shaft 26 for rotation with the shaft.

I provide both a fast drive system and a slow drive system for driving the gear 32 to move table 10 either rapidly or slowly through the reduction gearing including gears 28, 24, 36, 34 and 32. A continuously driven motor 38 energized from a source 40 of electrical energy drives a shaft 42 carrying respective pulleys 44 and 46 for rotation with it. A belt 48 provides a driving connection between pulley 44 and a second pulley 50 carried by a shaft 52 for rotation with the shaft. Pulley 50 has a diameter which is slightly smaller than the diameter of pulley 44, with the result that shaft 52 is driven at a slightly higher speed than is shaft 42. I mount the driving member 54 of an electric clutch indicated generally by the reference character 56 on shaft 52 for rotation with the shaft. I mount the driven member 58 of clutch 56 on a shaft 60 for rotation with the shaft. A gear 62 fixed on shaft 60 drives gear 32 when clutch 56 is energized to provide a driving connection between shafts 52 and 60. The system including pulleys 44 and 50 and shafts 52 and 60 forms the high-speed drive system for gear 32.

A belt 64 provides a driving connection between pulley 46 and a pulley 66 carried by a shaft 68 for rotation with the shaft. A belt 70 provides a driving connection between a second pulley 72 fixed on shaft 68 for rotation with the shaft and a pulley 74 carried by a shaft 76 for rotation with it. I mount the driving member 78 of a slow speed, electric clutch indicated generally by the reference character 80 on shaft 76 for rotation with the shaft. I fix the driven member 82 of clutch 80 on a shaft 84 for rotation with the shaft. A pinion 86 fixed on the shaft 84 engages gear 32 to drive gear 32 when clutch 80 is energized, in a manner to be described hereinafter, to couple shaft 76 to shaft 84. The diameter of pulley 66 is considerably larger than the diameter of pulley 46. Similarly, pulley 74 has a larger diameter than does pulley 72. Owing to the relative diameters of these pulleys, shaft 76 rotates at a much slower speed than does shaft 42. The system including pulleys 46, 66, 72 and 74 and shafts 76 and 84 makes up the slow speed drive for gear 32. It is to be understood that the terms high and low speed drives are used throughout the specification and claims in their relative sense.

Shaft 84 also carries for rotation with it the first member 88 of an electric brake indicated generally by the reference character 90. The second member 92 of brake 90 is mounted on any convenient stationary part of the machine (not shown). When energized by means to be described hereinafter, brake 90 prevents movement of shaft 84.

I mount the movable member 94 of an electrical impulse producing transducer indicated generally by the reference character 96 on shaft 84 for rotation with the shaft. I mount the stationary member 98 of the transducer 96 on any convenient stationary part (not shown) of the apparatus. The transducer 96 may be of any suitable form known to the art. In one form of transducer each of the members or disks 94 and 98 carries a plurality of radially extending conducting lines 100 connected at their inner ends to a conducting circle 102. As the members relatively rotate, the capacitance between the two conducting circles 102 varies as the lines 100 come into and out of registry with each other to produce a predetermined number of such variations in capacity for each revolution of the disks. Respective conductors 104 and 106 connect the disks to an oscillator and a detector network 108. It will readily be appreciated that as the disks 94 and 98 relatively rotate, the oscillator and detector 108 produces a number of electrical impulses equal to the number of variations in capacity. For example, in one type of transducer known to the art one hundred pulses per revolution of disk 94 are produced.

As will be explained hereinafter, only one of the clutches 56 or 80 is energized at any given time. With clutch 56 energized and clutch 80 de-energized, shafts 60 and 84 rotate at the high speed provided by shaft 52. With clutch 80 energized and with clutch 56 de-energized, both shafts 60 and 84 rotate at the slow speed provided by shaft 76. Obviously also, as will be explained hereinafter, brake 90 is not set when either of the clutches is energized.

In my system the number of impulses produced by the transducer 96 is a measure of the distance through which table 10 has rotated in the course of an indexing step. In order to count these pulses I connect the output channel of oscillator and detector 108 to the input channel of a counter 110 by an electrical channel 112. The oscillator and detector 108 may be of any type known to the art such, for example, as that described in the technical bulletin of September 1956, published by Berkeley division of Beckman Instruments Inc., Richmond, California. Counter 110 is of a type known in the art, such, for example, as the counter described in the technical bulletin dated September 1956, published by the Berkeley division of Beckman Instruments Inc., Richmond, California. It includes a first plurality of dials 114, which may be set to a first count, and a second plurality of dials 116, which may be set to a second count. When the number of impulses applied to the counter reaches the count to which dials 116 are set, the counter produces a first output signal. When the number of pulses to which the counter is set reaches the number to which dials 114 have been set, a second output signal is produced and the counter is conditioned again to begin to count pulses to the numbers or counts which have been set on the respective sets of dials 114 and 116. In other words, the operation of counter 110 is repetitive in nature. It is to be understood that the output signal from the channel associated with dials 116 continues after being initiated until the impulses reach the number to which dials 114 are set.

It is desirable that an indexing step be performed as rapidly as is possible, and it is necessary that the worktable be brought quickly to a stop at the end of a step. In order to accomplish both these ends I provide my apparatus with means for energizing the fast drive clutch 56 at the beginning of an indexing movement and with means for de-energizing this clutch and for energizing the slow speed clutch 80 a short time before the table 10 reaches the end of an indexing step to reduce the table inertia to permit it to be brought quickly to a stop by brake 90. I connect a push-button switch 118 in series with a rectifier 120, such as a crystal or the like, between the output terminal 122 of a suitable source of alternating current potential and one input terminal of a control element 124. The element 124 and other control elements to be described hereinafter are static electric controls made up of rectifiers and saturable core transformers which may be arranged to produce the same control functions as are performed by electromechanical relays. These static control devices have the advantage of including no movable parts and of requiring little power for their operation. The element 124 is a two-input "OR" circuit which produces an output signal if an input signal is applied to either of its input terminals. A conductor 126 connects the output terminal of element 124 to one input terminal of a control element 128. A signal applied to one terminal of the element 128 causes it to produce an output signal. If a second input signal is applied to the other input terminal of the element 128 the output signal is cut off. A conductor 130 connects the output signal from element 128 to the input terminal of control element 132 which reverses the phase of the output signal from output elements 128 to produce a feed-back signal which is conducted to the second input terminal of element 124 by a conductor 134. An amplifier 136 applies the output signal of element 132 to the high speed electric clutch 56. It will be appreciated that the elements 128 and 132 connected in the manner shown perform an "On-Off" control function. That is, a signal applied to one terminal, which may be designated the "On" terminal, of element 128 by channel 126 causes element 128 to produce an output signal which is phase-shifted by element 132 and fed back by conductor 134 to maintain element 128 conductive even after push-button switch 118 is released. This is the "On"

condition of the circuit including elements 128 and 132. A signal applied to the other, or "Off," terminal of element 128 renders element 128 nonconductive to remove the input signal to element 132 to remove the output signal of element 132. This is the "Off" condition of the circuit including elements 128 and 132.

A conductor 138 connects one output channel of counter 110 to one input terminal, the "On" terminal, of a control element 140. A rectifier 142 connects conductor 138 to the "Off" input terminal of element 128. A conductor 144 carries the output signal of element 140 to a phase-reversing element 146 which produces a feedback signal which is applied to the "On" input terminal of element 140 by a conductor 148. An amplifier 150 applies the output signal of element 146 to the slow speed electric clutch 80. Elements 140 and 146 perform an "On-Off" control function similar to that performed by elements 128 and 132.

I connect the second output channel of counter 110 to the other, or "Off," input terminal of element 140 by a conductor 152. A conductor 154 connects conductor 152 to the "On" input terminal of a control element 156 the other, or "Off," input terminal of which is supplied with a signal upon the actuation of switch 118 by a conductor 158. A conductor 160 connects the output terminal of element 156 to a phase-reversing control element 162, the output signal of which is fed back to the "On" input terminal of element 156 by a conductor 164. An amplifier 166 applies the output signal from element 162 to the electric brake 90.

From the system thus far described it will be seen that upon actuation of switch 118 element 124 momentarily applies an input signal to the "On" terminal of element 128 to cause element 132 to produce an output signal to energize the fast clutch 56 to cause table 10 to be moved at its high speed. As the table 10 moves, the oscillator and detector circuit 108 produces electrical impulses which are fed to counter 110. When the number of these pulses equals the count at which dials 116 are set, the first counter channel produces an output signal on conductor 138. This output signal is fed to the "Off" terminal of element 128 to cause clutch 56 to be de-energized. It is to be remembered that the feed-back signal on conductor 134 causes element 128 to continue to produce an output signal even after momentary actuation of switch 118. This output signal continues until a signal is applied to the "Off" terminal in the manner described. The signal produced by the counter output channel associated with dials 116 actuates element 140 to cause this element to produce an output signal which is fed to the slow speed clutch 80 to cause table 10 to be driven at its slow speed. As movement of the table continues, the number of impulses fed to the counter 110 reaches the count to which dials 114 are set, to cause the second counter output channel to produce an output signal. This output signal turns the element 140 off to cause clutch 80 to be deenergized. This second channel output signal also actuates element 156 to cause element 162 to produce an output signal for energizing brake 90 to stop the table. Feed-back connection 164 causes element 156 to continue to produce an output signal until a signal is applied to the "Off" terminal of this element. Upon the next actuation of switch 118 a signal will be applied to the "Off" terminal of element 156 through conductor 158.

My system includes means for automatically initiating the next indexing step after a predetermined time delay during which the desired operation is performed on the work. I connect a switch 167 and a time delay control element 168 in series with each other between the output terminal of element 162 and conductor 158 which is connected to the "Off" input terminal of element 156. Element 168 may be of any suitable type known to the art such, for example, as that described in the article, "Static Electrical Controls," by Ponstingl, appearing in the November 29, 1956, edition of "Machine Design," published by Penton Publishing Co., Penton Building, Cleveland, Ohio. An output signal from element 162 causes element 168 to produce an output signal after a predetermined time. If switch 167 is closed, the output signal from element 168 cuts off the signal from element 156 after the predetermined time delay.

In one specific form of my apparatus I have arranged it to define a revolution into any number of indexing steps from two to two hundred. Let us assume that for each complete revolution of table 10 the oscillator and detector circuit 108 produces a total number of counts equal to 250,000. With this total number of counts available for each revolution of the worktable it will be obvious that an even number of counts per indexing step will be the exception rather than the rule. Counter 110 cannot of course be set to a fractional number. If the counter is set to an integral number of counts per index where only a fractional number of counts per index are required, obviously an error will be introduced. Further, with the system thus far described this error will be cumulative throughout the revolution of the table. I have provided my apparatus with means for averaging this error to reduce the over-all error to a point at which the effect of the error is negligible. To accomplish this I first set the counter dials 114 to a count which is the next higher integral number over the fractional number of counts per indexing step required. For a first predetermined number of indexing steps I permit the system to operate normally. For a second predetermined number of indexing steps I apply an extraneous impulse to the counter to cause is to register one more count than the number of counts actually produced by the oscillator and detector 108. When this is done the actual movement of the table corresponds to a number of counts which are one less than the number for which the counter dials 114 are set. The predetermined number of indexing steps for which I add counts and the number for which I permit the system to operate normally are determined by the fraction of a count in the determined number of counts per indexing step. I add counts for a number of indexing steps which, divided by the total number of indexing steps both for which I add and for which I do not add counts, produces a fraction which most closely approaches the fractional count included in the number of counts per indexing step. For example, if the fraction is 0.2308, I add a count for three indexing steps and do not add a count for ten indexing steps. This averages out to three divided by thirteen or 0.2308 counts added for each of the thirteen indexing steps. It is to be understood that I repeat this procedure throughout the entire revolution of table 10. While each indexing step is not precisely the same as all others, I have averaged the error and have caused the error to be repetitive throughout the indexing operation. This is of particular advantage in a great number of applications. For example, when turbine vanes are punched into the inner component of an outer shroud with my apparatus they may further be punched through the outer component of the outer shroud using the same indexing setup.

In Table I below I have shown the number of indexing steps for which a count or impulse must be fed into the counter and the number of counts for which the system is permitted to operate normally to produce a large number of fractional divisions of an integer. To produce fractions from 0 to 0.5 extraneous counts are fed to the counter for the number of indexing steps under the "Add" column and the system is permitted to function normally for the number of indexing steps under the "No" column in the table. To produce fractions from 0.5 to 1.0 no counts are added for the number of indexing steps in the "Add" column and extraneous counts are added for the number of indexing steps under "No" column in the table.

Table I

| Fractional Count | Complement | Add | No | Fractional Count | Complement | Add | No |
|---|---|---|---|---|---|---|---|
| 0.0000 | 1.0000 | 0 | 0 | 0.3571 | 0.6429 | 5 | 9 |
| 0.0909 | 0.9091 | 1 | 10 | 0.3636 | 0.6364 | 4 | 7 |
| 0.1000 | 0.9000 | 1 | 9 | 0.3750 | 0.6250 | 3<br>6 | 5<br>10 |
| 0.1111 | 0.8889 | 1 | 8 | | | | |
| 0.1250 | 0.8750 | 1 | 7 | 0.3846 | 0.6154 | 5 | 8 |
| 0.1428 | 0.8572 | 1 | 6 | 0.4000 | 0.6000 | 2<br>4<br>6 | 3<br>6<br>9 |
| 0.1667 | 0.8333 | 1<br>2 | 5<br>10 | | | | |
| 0.1818 | 0.8182 | 2 | 9 | 0.4118 | 0.5882 | 7 | 10 |
| 0.2000 | 0.8000 | 1<br>2 | 4<br>8 | 0.4167 | 0.5833 | 5 | 7 |
| | | | | 0.4286 | 0.5714 | 3<br>6 | 4<br>8 |
| 0.2222 | 0.7778 | 2 | 7 | | | | |
| 0.2308 | 0.7692 | 3 | 10 | 0.4375 | 0.5625 | 7 | 9 |
| 0.2500 | 0.7500 | 1<br>2<br>3 | 3<br>6<br>9 | 0.4444 | 0.5556 | 4<br>8 | 5<br>10 |
| | | | | 0.4545 | 0.5545 | 5 | 6 |
| 0.2727 | 0.7273 | 3 | 8 | 0.4615 | 0.5385 | 6 | 7 |
| 0.2856 | 0.7144 | 2<br>4 | 5<br>10 | 0.4667 | 0.5333 | 7 | 8 |
| | | | | 0.4706 | 0.5294 | 8 | 9 |
| 0.3000 | 0.7000 | 3 | 7 | 0.4737 | 0.5263 | 9 | 10 |
| 0.3077 | 0.6923 | 4 | 9 | 0.5000 | 0.5000 | 1<br>2 | 1<br>2 |
| 0.3333 | 0.6667 | 1<br>2<br>3<br>4<br>5 | 2<br>4<br>6<br>8<br>10 | | | etc. | |

I provide my apparatus with automatic means for adding counts for the proper predetermined number of times to approximate the fraction in the number of counts per index. A first relay 1CR includes a plurality of normally open switches 1CR-1 to 1CR-11 connected between respective circularly disposed contacts 170 and a common conductor 172. A contact arm 174 is adapted to be moved to engage any one of the contacts 170. An amplifier 176 applies the output signal from the second channel of counter 110 to a conductor 178 to which I connect arm 174. I connect the actuating relay winding 1CR associated with contacts 1CR-1 to 1CR-11 in series with a normally open relay switch CRL-1 between conductor 178 and the other amplifier conductor 180. My extraneous pulse-applying circuit includes a second relay having a plurality of switches 2CR-1 to 2CR-11 connected between respective circularly arranged contacts 182 and a common conductor 184. I connect the contact arm 186 adapted to engage a contact 182 to conductor 178. I connect the relay winding 2CR associated with 2CR-1 to 2CR-11 in series with a normally closed relay switch CRUL-1 between conductors 178 and 180. A reset winding 1CRR and a winding CRUL connected in parallel with each other between common conductor 172 and conductor 180 respectively reset contacts 1CR-1 to 1CR-11 and open normally closed switch CRUL-1 when energized. A reset winding 2CRR and a winding CRL connected in parallel with each other between common conductor 184 and conductor 180 are adapted when energized respectively to reset switches 2CR-1 to 2CR-11 and to close normally open switch CRL-1. A mechanical linkage 188 gangs relays CRUL and CRL to cause them to act together. When relay switch CRL-1 closes and amplifier 176 produces an output signal, a voltage is developed across a resistance 190 connected in parallel with winding 1CR. A brush 192 associated with resistor 190 picks a portion of the developed voltage off the resistor. A conductor 194 feeds the pulse picked off by brush 192 to the input of counter 110.

Each time an indexing step is completed the second output channel of the counter produces an output pulse which energizes winding 2CR through switch CRU1-1 to close switches 2CR-1 to 2CR-11 in sequence. In the position of contact arm 186 shown in the drawings, after the fourth step switch 2CR-4 closes to complete the circuits of windings 2CRR and CRL to reset switches 2CR-1 to 2CR-11 and to close switch CRL-1. Owing to the linkage 188 switch CRUL-1 opens when switch CRL-1 closes. At the end of the next interval the pulse from the second counter channel energizes winding 1CR through the now closed switch CRL-1 to actuate the first switch 1CR-1. At the same time a voltage is developed across resistor 190 to cause a pulse to be fed to the counter. This action continues until the switch to which arm 174 is connected closes. At this time windings 1CRR and CRUL are energized to reset switches 1CR-1 to 1CR-11 and to cause switch CRUL-1 to close and switch CRL-1 to open. This resets the extraneous pulse-applying circuit for its next operation. It will be seen that no pulses are applied to the counter for a number of indexing steps corresponding to the number of the switch to which arm 186 is connected. A number of impulses are applied to the counter for a number of indexing steps corresponding to the number of the switch to which arm 174 is connected. In this manner I may account for the fractional counts per index by setting arm 186 to a switch corresponding to the number of indexing steps for which no count is to be added and by setting arm 174 to a switch corresponding to the number of indexing steps for which a count is to be added.

By way of example, in Table II below I have shown the setups of the switches for indexing in a number of steps from 180 to 200. I have also indicated the error in the average count per index with the setups illustrated.

Table II

| No. of Indexes | Counts per Index | Relays 174 | Relays 186 | Average Count per Index | Error in Avg. Count |
|---|---|---|---|---|---|
| 180 | 1388.8889 | 8 | 1 | 1388.8889 | |
| 181 | 1381.2155 | 2 | 7 | 1381.2222 | +0.0067 |
| 182 | 1373.6264 | 5 | 3 | 1373.6250 | −0.0014 |
| 183 | 1366.1202 | 1 | 7 | 1366.1250 | +0.0048 |
| 184 | 1358.6957 | 9 | 4 | 1358.6923 | −0.0034 |
| 185 | 1351.3514 | 5 | 9 | 1351.3571 | +0.0057 |
| 186 | 1344.0860 | 1 | 10 | 1344.0909 | +0.0049 |
| 187 | 1336.8983 | 9 | 1 | 1336.9000 | +0.0017 |
| 188 | 1329.7872 | 7 | 2 | 1329.7778 | −0.0094 |
| 189 | 1322.7567 | 3 | 1 | 1322.7500 | −0.0067 |
| 190 | 1315.7895 | 4 | 1 | 1315.8000 | +0.0105 |
| 191 | 1308.9005 | 10 | 1 | 1308.9091 | +0.0086 |
| 192 | 1302.0833 | 1 | 10 | 1302.0909 | +0.0076 |
| 193 | 1295.3368 | 1 | 2 | 1295.3333 | −0.0035 |
| 194 | 1288.6598 | 2 | 1 | 1288.6667 | +0.0069 |
| 195 | 1282.0513 | 1 | 10 | 1282.0909 | +0.0396 |
| 196 | 1275.5102 | 1 | 1 | 1275.5000 | −0.0102 |
| 197 | 1269.0355 | | | 1269.0000 | −0.0355 |
| 198 | 1262.6263 | 5 | 3 | 1262.6250 | −0.0013 |
| 199 | 1256.2814 | 2 | 5 | 1256.2856 | +0.0042 |
| 200 | 1250.0000 | | | 1250.0000 | |

In operation of my readily adjustable electric indexing apparatus I first determine the number of counts per indexing step for the desired number of indexing steps. In most cases this will be a fractional number. I set the dials 114 to a number of counts which is the next higher integral number to the number of impulses per indexing step. I set arm 174 to add counts for the number of steps required, and set arm 186 to the number of steps for which no count is to be added, for the fractional count per index involved. As has been explained hereinabove, the settings of these arms 174 and 186 can readily be determined from Table I. I set the dials 116 to a count which is a predetermined number of counts less than the setting of dials 114 to permit the table to slow down as it approaches the end of the indexing step. If automatic operation is desired I first close switch 167. To initiate the indexing operation, I actuate pushbutton switch 118 to provide an input signal for element 128 to cause element 132 to produce an output which eneregizes clutch 56 to drive table 10 at its high rate of speed. Feed-back conductor 134 maintains the circuit of element 128 even after button 118 is released. As the table moves, oscillator and detector circuit 108 continually produces output signals. When the number of pulses fed to counter 110 reaches the count to which dials 116 are set, the first counter output channel produces an output signal which cuts off element 128 and which causes element 140 to produce an output signal. The output signal of element 140 causes element 146 to produce an output signal which energizes clutch 80 to cause table 10 to be driven at its slow speed. It will be remembered that clutch 56 is de-energized when element 128 ceases to produce an output signal.

As the table continues to rotate, the number of impulses fed to the counter reaches the count to which dials 114 are set to cause the second output channel of the counter to produce an output pulse. This output pulse turns element 140 off to de-energize clutch 80. At the same time it turns element 156 on to energize brake 90 to stop the table. This pulse from the second counter channel is fed to the extraneous pulse-producing network to produce extraneous pulses as required, in the manner described hereinabove. The output of element 162 which is maintained by feed-back connection 164 is applied to the time delay element 168. After a predetermined time element 168 produces an output signal which turns element 156 off and which turns element 128 on to begin the next indexing step. During the time delay provided by element 168 the desired operation may be performed on the worktable.

From the foregoing it will be seen that my system operates with a high degree of accuracy. The number of indexing intervals or steps may readily be changed merely by resetting the dials of counter 110, and the arms 174 and 186.

It will be seen that I have accomplished the objects of my invention. I have provided a readily adjustable electric indexing apparatus which is simple in construction and operation. My apparatus is accurate and produces only a small error which is repetitive throughout the indexing revolution. My system is highly flexible in that a wide range of different indexing steps is available. The number of steps may be changed merely by changing dial settings.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is therefore to be understood that my invention is not to be limited to the specific details shown and described.

Having thus described my invention, what I claim is:

1. Electrical indexing apparatus for indexing a machine member including in combination high-speed drive means adapted to be energized to drive said member, low-speed drive means adapted to be energized to drive said member, means for energizing said high-speed drive means to cause said member to move, means responsive to movement of said member for producing a certain number of electrical impulses proportional to movement of said member, means for counting said impulses to produce a first output signal when the counted impulses reach a first predetermined number and to produce a second output signal when the counted impulses reach a second predetermined number, means responsive to said first output signal for de-energizing said high-speed drive means and for energizing said low-speed drive means, means responsive to said second output signal for de-energizing said low-speed drive means and means responsive to said second output signal for re-energizing said high-speed drive means.

2. Electrical indexing apparatus as in claim 1 including a brake adapted to be actuated to arrest movement of said member, and means responsive to said second output signal for actuating said brake.

3. Electrical indexing apparatus for moving a machine member through a complete revolution in a predetermined number of steps including in combination drive means adapted to be energized to rotate said member, means for energizing said drive means, means responsive to the operation of said drive means for producing a predetermined number of electrical impulses per revolution of said member, means for counting said impulses to produce an output signal when the counted pulses reach a predetermined number, means responsive to said output signal for de-energizing said drive means and means responsive to said output signal for feeding a pulse to said counter for a predetermined number of said steps when the quotient of said predetermined number of impulses divided by said predetermined number of steps is a fractional number.

4. Electrical indexing apparatus for moving a machine member through a complete revolution in a predetermined number of steps including in combination drive means adapted to be energized to rotate said member, means for energizing said drive means, means responsive to the operation of said drive means for producing a certain number of electrical impulses for a revolution of said member, means for counting a predetermined number of said impulses equal to said certain number of impulses divided by said predetermined number of steps to produce an output signal, means responsive to said output signal for de-energizing said drive means and means responsive to said output signal for re-energizing said drive means.

5. Electrical indexing apparatus for moving a machine member through a complete revolution in a predetermined number of steps including in combination drive means adapted to be actuated to rotate said member, means for actuating said drive means, means responsive to the operation of said drive means for producing a certain number of electrical impulses for a revolution of said member, means for counting a predetermined number of said impulses to produce an output signal when the counted pulses equal a number of counts for which the counting means is set, means responsive to said output signal for deactuating said drive means and means including an output channel responsive to said output signal for feeding an extra impulse to said counter for a predetermined number of said steps when the quotient of said certain number of impulses divided by said predetermined number of steps is a fractional number.

6. Electrical indexing apparatus as in claim 5, in which said extra impulse feeding means comprises pulse producing means adapted to be actuated by said output signal, first means responsive to said output signal for applying said output signal to said pulse producing means after a first number of said steps and second means responsive to said output signal for disconnecting said output signal channel from said pulse producing means after a second number of said steps.

7. Electrical indexing apparatus as in claim 5 in which said extra impulse feeding means comprises a first relay having a winding and a number of serially operated normally open switches, a second relay having a winding and a number of serially operated normally open switches, means normally connecting said first relay winding to said counting means whereby said output signal serially actuates said first relay switches, extra impulse producing means responsive to said output signal, normally open means connecting said second relay winding and said pulse producing means to said counting means, means responsive to the operation of a predetermined one of said first relay switches for opening said first relay winding connecting means and for closing said normally open means, and means responsive to operation of a predetermined one of said second relay switches for closing said first relay connecting means and for opening said second relay connecting means.

8. Electrical indexing apparatus for indexing a machine element including in combination high-speed drive means for said element, low-speed drive means for said element, means for actuating said high-speed drive means, means for actuating said low-speed drive means, means for energizing said high-speed drive actuating means to drive said element, means responsive to a first predetermined movement of said element for de-energizing said high-speed drive actuating means and for energizing said low-speed drive actuating means, means responsive to a second predetermined movement of said element for de-energizing said low-speed drive actuating means and time delay means responsive to operation of the means responsive to the second predetermined movement for re-energizing the high-speed drive actuating means after a predetermined time delay.

9. Electrical indexing apparatus for indexing a machine member including in combination means adapted to be actuated to drive said member, means for actuating said drive means to cause said member to move, means responsive to said drive means for producing a predetermined number of electrical impulses for a given movement of said member, means for counting said impulses to produce an output signal when the counted pulses reach said predetermined number, means responsive to said output signal for deactuating said drive means and means responsive to said drive means deactuating means for reactuating said drive means after a predetermined time delay.

References Cited in the file of this patent

UNITED STATES PATENTS

| | | |
|---|---|---|
| 1,455,795 | Logan | May 22, 1923 |
| 2,481,383 | Bickel et al. | Sept. 6, 1949 |
| 2,710,934 | Senn | June 14, 1955 |
| 2,854,114 | Hillyer | Sept. 30, 1958 |